United States Patent [19]

Lewis et al.

[11] Patent Number: 5,090,447
[45] Date of Patent: Feb. 25, 1992

[54] TRANSPARENT BALL VALVE ASSEMBLY

[75] Inventors: Leslie B. Lewis, Chestnut Hill; Timothy Robinson, Tewksbury, both of Mass.

[73] Assignee: Asahi/America, Inc., Malden, Mass.

[21] Appl. No.: 679,618

[22] Filed: Apr. 3, 1991

[51] Int. Cl.⁵ .................................................. F16K 3/22
[52] U.S. Cl. ........................................ 137/559; 251/315
[58] Field of Search .................. 137/551, 559; 251/315, 251/368, 129.11

[56] References Cited

U.S. PATENT DOCUMENTS

| | | | |
|---|---|---|---|
| 3,257,094 | 6/1966 | Vischer | 251/129.11 |
| 3,916,948 | 11/1975 | Benjamin | 137/608 |
| 3,960,166 | 6/1976 | Linser | 251/368 X |
| 4,207,923 | 6/1980 | Giurtino | 251/309 X |
| 4,210,174 | 7/1980 | Eross | 137/559 |
| 4,449,694 | 5/1984 | Hobart | 251/315 X |
| 4,556,194 | 12/1985 | van Lingen | 251/129.12 |
| 4,982,760 | 1/1991 | Mustaklem | 251/314 X |

*Primary Examiner*—Alan Cohan
*Attorney, Agent, or Firm*—Anthony J. Casella; Gerald E. Hespos

[57] ABSTRACT

A thermoplastic valve assembly for use in controlling the flow of corrosive fluids comprising a transparent housing having a passageway through which fluid may flow, a transparent ball disposed in the passageway for rotation between an open position and a closed position, and transparent connector means for connecting the valve housing to a pipeline thereby enabling an operator to visually detect alignment of the ball, turbulence in the through passageway and wear and corrosion of the valve components.

1 Claim, 3 Drawing Sheets

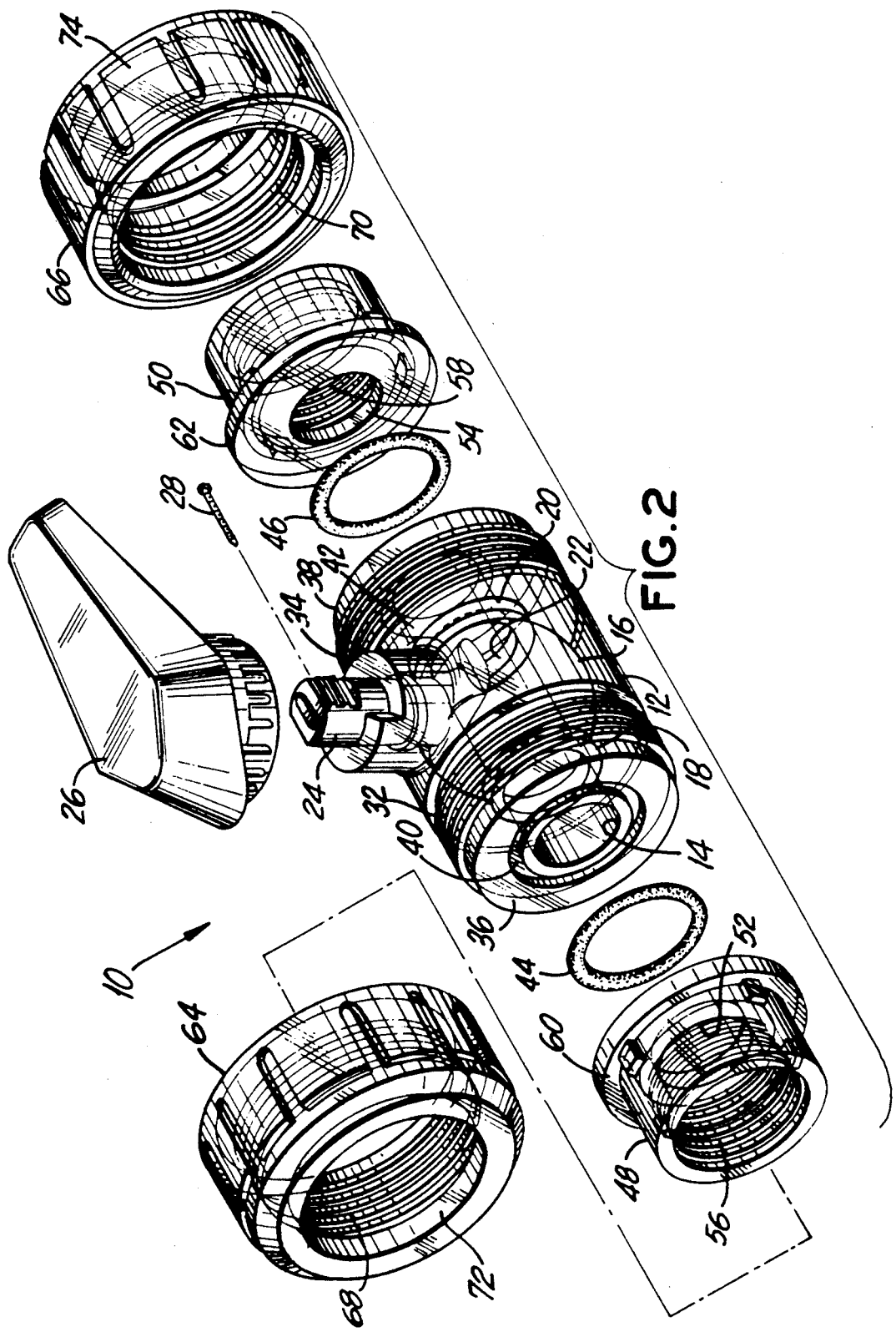

TRANSPARENT BALL VALVE ASSEMBLY

BACKGROUND OF THE INVENTION

Valves formed from an inert, corrosion resistant thermoplastic material are well suited for use in chemical engineering systems. These corrosion resistant thermoplastic valves can be used with pipes or tubing formed from the same or similar material to accommodate and precisely control the flow of polycorrosive chemicals. For example, valves of this type often are used to accommodate and control the flow of sulfuric acid, nitric acid and other oxidizing chemicals as well as caustics, solvents and halogens and other problem materials at temperatures to 250° F., pressures to 150 psi and flows of up to 18,500 gpm.

Valves and pipes used in corrosive liquid systems, as described herein are typically formed from polyvinyl chloride (PVC) or a chlorinated polyvinyl chloride (CPVC). For certain uses, valves and pipes may also be formed from polypropylene or polyvinylindene fluoride (PVDF).

The chemical engineering systems in which these corrosion resistant thermoplastic valves are used often require precise on-off functioning of one or more valves. The valves employed to carry out these on-off functions are typically ball valves. In many instances, the success of a particular chemical engineering operation depends upon the precise mode change from opened-to-closed or from closed-to-open. Mode changes on ball valves require the rotation of the valve stem through a 90° angle. A rotation of something other than 90° will result in a valve that is either not completely closed or not entirely opened. Thus, rotation of a valve stem on a ball valve through an angle either less than or greater than 90° could result in a continued small flow of a particular corrosive chemical during periods when that chemical is no longer required. Conversely, certain improper rotations of the valve stem on a ball valve could result in a less than optimum flow of a particular corrosive chemical when full flow is required.

Thermoplastic valves of the type used in chemical engineering systems may be manually actuated by a pipeline operator, or they may be automatically actuated from a remote location. Manually actuated valves include handles which communicate with the valve stem to rotate the valving member through mode changes. Continuous manual service over long periods of time could degrade the connection between the handle and the stem. Consequently, the handle may slip relative to the stem thereby causing undetected incomplete rotations of th valving member. Automated valves may be electrically actuated through gear trains or linkage mechanisms. Continuous service over long periods of time could result in wear of these mechanical parts. Consequently, the valving member may not achieve complete mode changes when optimum flow of chemicals is required. Furthermore, automated valves rely upon electrical circuitry that may fail due to short circuits, thereby resulting in undetected inoperative valving members.

An additional factor that may influence the success of a particular chemical engineering operation is the generation of turbulent flow patterns in the corrosive chemicals passing through the piping system. In general, turbulent flow is generated by pipe friction and sudden expansions or contractions in the piping system. Turbulence may be caused by wear or damage to pipes, O-rings or valve seats due to the action of chemicals therein. Turbulence may also occur at fittings or valves. Turbulent flow results in head losses which vary as the square of the velocity. Turbulence in the piping system may result in a less than optimum flow of a particular corrosive chemical when full flow is required. In most instances, head losses are determined experimentally through data retrieval. However, equipment for measuring pressure adds to the system cost. Furthermore, the corrosive fluid in these systems can eventually affect the performance of pressure measuring means.

A further concern associated with chemical engineering operations is safety. In particular, leak detection and prevention is an essential element of any chemical operation since a leak occurring in a piping system carrying caustics or oxidizing chemicals could cause severe injury or even loss of life. In general a leak in a piping system will likely occur at pipe couplings which are usually associated with valves.

The prior art includes valves for medicinal fluids that are intended to enable a doctor or medical technician to visually observe the flow of fluid therethrough. U.S. Pat. No. 3,916,948 entitled "CONTROL VALVES FOR MEDICINAL PURPOSES" which issued to Benjamin on Nov. 4, 1975 discloses a version of a check valve for use in catheters for controlling the flow of body fluids. The valve has at least three flexible tubes made of a material which is at least partially transparent. The flexible tubes are connected together and form an intercommunicating central crossover. A solid ball defining an outside diameter greater than the inside diameter of the tubes is engageable within either of the tubes, and is held in the selected tube by the elasticity of the flexible plastic. The solid ball may be moved from one flexible tube to the next by squeezing the tubes. The transparency of the housing disclosed in U.S. Pat. No. 3,916,948 enables the doctor or medical technician to determine which flexible tube the ball is in. The elastic valve disclosed in U.S. Pat. No. 3,916,948 is unsuitable for use in the regulation of high pressure and high temperature flows of corrosive chemicals and caustics.

U.S. Pat. No. 4,210,174 entitled "POSITIVE PRESSURE VALVES" which issued to Eross on July 1, 1980 discloses a positive pressure valve for use in ventilators, anesthesia machines, resuscitators, and other inhalation therapy devices where it is desired to place a controlled pressure on a patient's lungs. The valve disclosed in U.S. Pat. No. 4,210,174 basically comprises a cylindrical clear plastic housing with a side arm at one end providing an inlet port and a side arm at the other end forming an outlet. A magnet is disposed in the flow path of the valve housing and exerts a pulling force on a metallic portion of a solid valving disc to urge the disc into a valve seat. The valve disclosed in U.S. Pat. No. 4,210,174 is unsuitable for use in the regulation of corrosive chemicals and caustics since it employs metallic parts that would corrode in a chemical engineering system.

The transparent medicinal fluid control devices described in the prior art do not providing visible leak detection at connective fittings.

Therefore, it is an object of the subject invention to provide a ball valve assembly which enables an observer to visually detect leaks which may occur proximate to improperly sealed fittings or damaged O-rings.

It is another object of the subject invention to provide a ball valve assembly which enables an observer to visually detect turbulent flow patterns in the fluid passing therethrough so as to ensure the efficient operation of a chemical engineering operation.

It is a further object of the subject invention to provide a ball valve assembly which enables an observer to visually ensure precise on-off mode changes and positioning of the valving member.

SUMMARY OF THE INVENTION

The subject invention is directed to a transparent valve assembly formed from a corrosion resistant thermoplastic material such a PVC or CPVC. At least selected components of the valve assembly are transparent to enable fluid flow through the valve or incipient leakage from the primary fluid flow path to be observed. The valve assembly comprises a transparent housing having a visually observable flow path therethrough. A valving member, which may also be transparent, is disposed in a valve seat provided in the housing for selectively blocking the flow path. An actuator extends through the housing for selectively moving the valving member between a closed position and an opened position.

The valving member may be a ball having a flow path therethrough. The valve assembly may be provided with a handle actuator for manual rotation of the valving member. Alternatively, the actuator may be a motor gear housing for automated rotation of the valving member.

A pair of nipples, which may also be transparent, may be provided for establishing direct fluid connection between the valve and an associated piping system. Elastomeric 0-rings may be provided between each of the nipples and the valve housing for sealing purposes. The coupling relationship between the valve housing and the nipples may be assured by tightening a pair of union nuts, which also may be transparent.

The transparency of at least portions of the valve assembly of the subject invention enables an observer to visually detect leaks occurring at the fittings due to improper tightening of the union nuts and further enables detection of damaged 0-rings which could cause a leak to occur. Further, the transparent housing of the valve assembly and the transparent valving member will enable an observer to visually detect turbulent flow patterns in the fluid passing therethrough. Additionally, the transparent housing of the valve assembly will enable an observer to visually detect wear and damage to the valve seat. Furthermore, the transparent housing of the valve assembly will enable an observer to visually ensure precise on-off mode changes of the valving member.

BRIEF DESCRIPTION OF THE DRAWINGS

FIG. 2 is an exploded view of the transparent ball valve assembly of the subject invention.

DETAILED DESCRIPTION OF THE PREFERRED EMBODIMENTS

Figure 1:
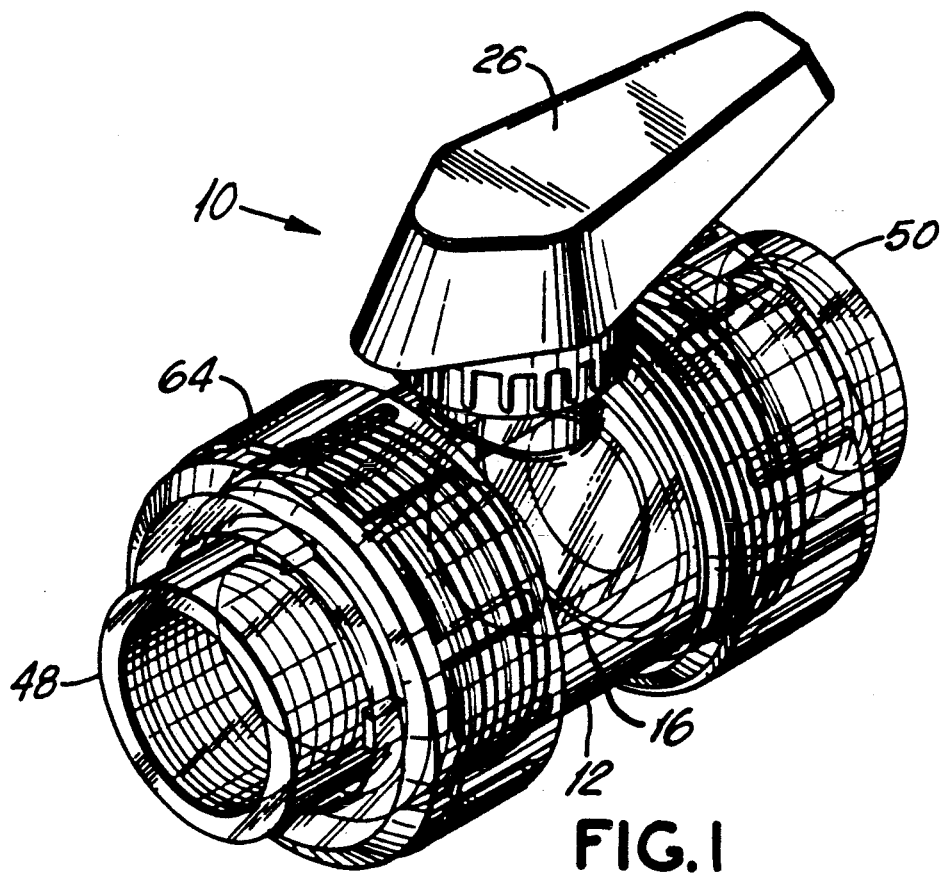
FIG. 1 is a perspective view of the transparent ball valve assembly of the subject invention.

A preferred embodiment of the valve assembly of the subject invention is illustrated in FIGS. through 3 and is designated generally by reference numeral 10. The latter basically comprises a generally cylindrical housing 12 of a transparent thermoplastic material, with a cylindrical passage 14 extending therethrough. A transparent ball 16 is rotationally mounted in Teflon ® valve seats 18 and 20 within the valve housing 12. The ball 16 includes a cylindrical passage 22 of a diameter substantially equal to the diameter of the cylindrical passage 14. Valve stem 24 is fixedly mounted to the ball 16 and is aligned perpendicular to the axes of cylindrical passages 14 and 22. Both the valve stem 24 and the ball 16 are rotationally mounted in the valve housing 12. Additionally, the ball 16 is positioned relative to the valve housing 12 such that the axis of the cylindrical passage 22 of the ball 16 either intersects with or is collinear with the axis of the cylindrical passage 14 of the housing 12. The relative alignment of the axes of the cylindrical passages 14 and 22 is determined by the rotational disposition of the valve stem 24 and the ball 16 in the valve housing 12.

In operation, when the axes of the cylindrical passages 14 and 22 are collinear, the valve assembly 10 enables maximum flow of fluid. Conversely, when the axes of cylindrical passages 14 and 22 are intersecting and perpendicular to one another, fluid flow through the valve assembly 10 is prevented.

Figure 4:
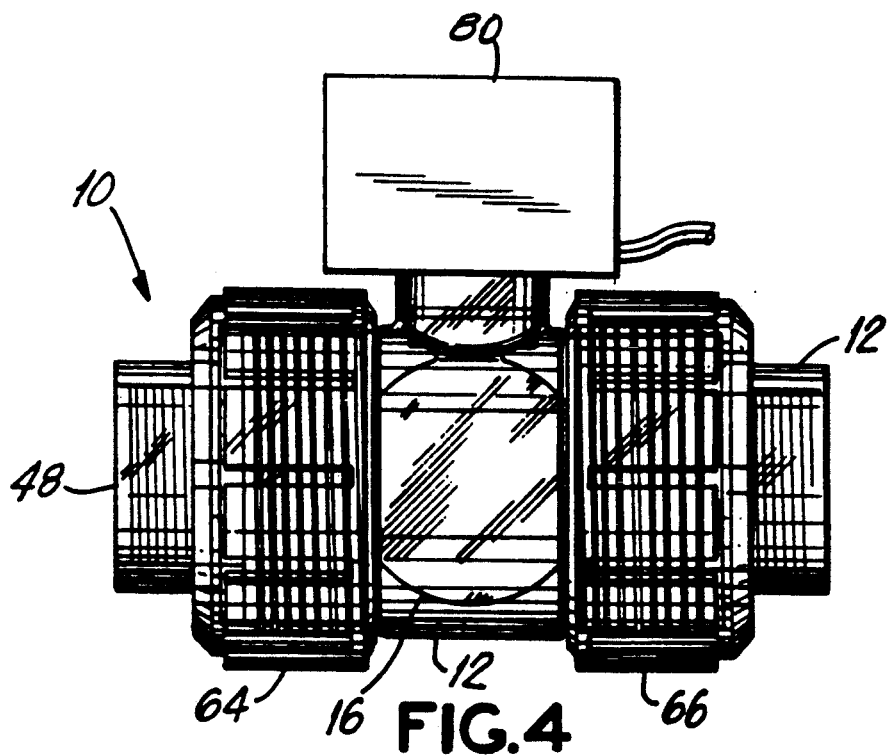
FIG. 4 is a side elevational view of an alternate embodiment of a transparent ball valve assembly of the subject invention.

Actuation of the valve stem 24 may be achieved manually by means of handle 26. The handle 26 is fastened to valve stem 24 by a set screw 28. Continuous service over long periods of time may degrade the connection between the handle 26 and the valve stem 24 thereby causing slippage of the stem 24 relative to the handle 26. Consequently, slippage may result in incomplete on-off mode changes of the ball 16. However, an observer may readily visually detect an improper rotational disposition of the ball 16 by peering through the transparent valve housing 12. Similarly, referring to the alternate embodiment of FIG. 4, actuation of the valve stem 24 may be electrically controlled with a motor gear housing 80. Continuous service over extended periods of time may cause the gears to wear which may cause backlash and subsequent slippage of the stem 24 relative to the motor gear housing 80. Consequently, slippage may result in incomplete on-off mode changes of the ball 16. However, as with the manual valve of FIG. 1, an observer may visually detect an improper rotational disposition of the ball 16 by peering through the transparent valve housing 12. Furthermore, a short circuit in the electrically controlled motor gear housing 80 could go undetected and hence the ball 16 may not rotate when actuation thereof is required. However, an observer may visually detect the inoperative ball 16 by peering through the transparent valve housing 12 of the valve assembly 10 of the subject invention thereby preventing the failure of a particular chemical engineering operation.

Figure 3:
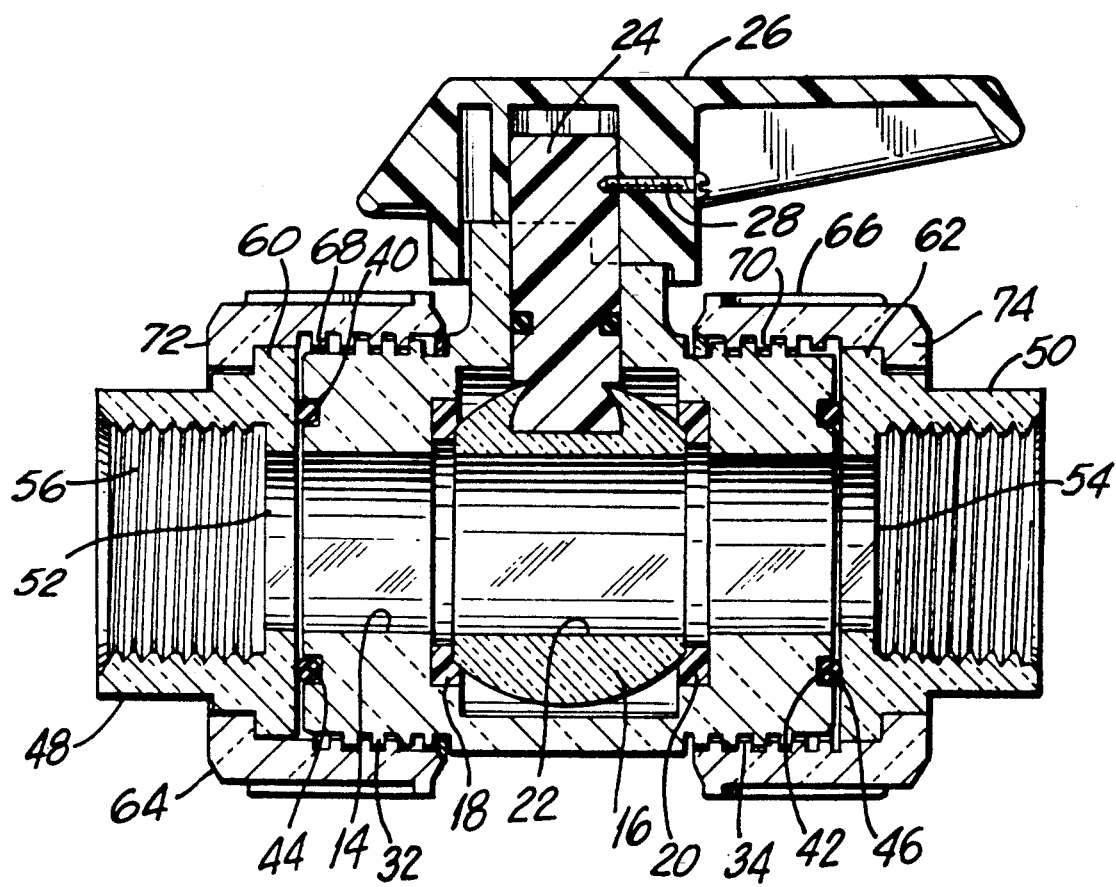
FIG. 3 is a cross-sectional view of the transparent ball valve assembly of the subject invention.

Referring again to FIG. 3, the valve housing 12 is formed at both of its ends with pipe coupling threads 32 and 34 adjacent the opposed distal ends 36 and 38 thereof so as to serve for pipe connection. Further, the opposed end surfaces 36 and 38 of the valve housing 12 are formed with annular grooves 40 and 42 for accommodating elastomeric 0-ring seals 44 and 46 for sealing purposes relative to the valve housing 12. A pair of transparent nipples are designated by numerals 48 and 50 each having respective fluid passages 52 and 54 adapted for establishing direct fluid connection with the valve passage 14 formed within the valve body 12. Further, transparent nipples 48 and 50 may be formed with female pipe threads 56 and 58, respectively, so as to form detachable thread connections with threaded end pipes of a fluid piping system, (not shown). The transparent nipples 48 and 50 are formed with respective outer shoulders 60 and 62. The coupling relationship between the valve housing 12 and the nipples 48 and 50 are assured by tightening transparent union nuts 64 and 66 onto the threads 32 and 34 disposed adjacent the opposed distal ends 36 and 38 of valve housing 12, respectively. For this purpose the union nuts 64 and 66 are formed with female pipe threads 68 and 70, respectively, for engaging the threads 32 and 34 disposed adjacent the opposed ends 36 and 38 of the valve housing 12. Further union nuts 64 and 66 are formed with inwardly extending annular flanges 72 and 74 which are dimensioned to retain the respective outer shoulders 60 and 62 of the nipples members 48 and 50 upon tightening of said union nuts 64 and 66.

To install the transparent ball valve assembly 10 of the subject invention in its service position the transparent nipples 48 and 50 may be connected to threaded end pipes, not shown, in such a manner as to allow concentric positioning of the associated transparent union nuts 64 and 66. Thereafter, the transparent valve housing 12 may be aligned such that the cylindrical channel 14 extending therethrough is collinear with the cylindrical passages 52 and 54 extending through the nipples 48 and 50, respectively. Alternatively, the nipples 48 and 50 may be provided without the pipe threads 56 and 58 so that they may be welded or bonded to end pipes. Thereupon, the threaded union nuts 64 and 66 may be tightened onto the pipe coupling threads 32 and 34 disposed adjacent distal ends 36 and 38 of the valve body 12 so as to ensure a proper connection.

At such a time, fluid may be passed through the pipe system and an observer is able to visually detect any fluid leaking from the area in the vicinity of the 0-ring seals 44 and 46 disposed in the annular grooves 40 and 42 relative to the transparent valve housing 1 of the valve assembly 10 of the subject invention. Further, an observer will have the ability to visually detect an improper rotational disposition of the ball 16 in the valve housing 12. Furthermore, an observer will have the ability to visually detect turbulent flow patterns occurring within the cylindrical passageway 14 extending through the transparent valve housing 12 and the cylindrical passageway extending through the transparent ball 16. Upon detecting turbulent flow patterns in the fluid passing through the valve assembly 10 of the subject invention, the operator may vary the parameters of the fluid so as to reduce head losses and thereby ensure efficient operation of the chemical engineering system.

Although the invention has been described with regard to a preferred embodiment, it is apparent that modifications can be made without departing from the scope of the invention as defined by the appended claims.

We claim:

1. A transparent thermoplastic ball valve assembly for regulating a flow of polycorrosive fluids through a pipeline and enabling visual detection of leakage of the polycorrosive fluids at locations where the transparent ball valve assembly is joined with the pipeline, the ball valve assembly comprising;
   a rigid transparent thermoplastic valve body having planar end faces and externally threaded portions adjacent the respective planar end faces;
   opposed transparent thermoplastic nipples each having an end for mating with the pipeline and an opposed mounting face disposed in face-to-face coupling relationship with one of the opposed planar end faces of the transparent valve body; and
   opposed transparent thermoplastic union nuts threadably engaged with the external threaded portion adjacent a respective one of the planar end faces of the valve body and urging the planar mounting face of the respective transparent nipple into coupling relationship with the corresponding planar end face of the transparent valve body, whereby the transparency of the nipples, the valve body and the union nuts enables visual detection of polycorrosive fluid leadage at the coupling of the transparent valve body with the opposed transparent nipples.

* * * * *